US 6,606,189 B2

(12) United States Patent  (10) Patent No.: US 6,606,189 B2
Akiyama  (45) Date of Patent: Aug. 12, 2003

(54) LIGHT AMPLIFIER AND LIGHT AMPLIFYING METHOD (75) Inventor: Kouiti Akiyama, Tokyo (JP)

(73) Assignee: NEC Corporation (JP)

( * ) Notice: Subject to any disclaimer, the term of this patent is extended or adjusted under 35 U.S.C. 154(b) by 30 days.

(21) Appl. No.: 10/026,216

(22) Filed: Dec. 19, 2001

(65) Prior Publication Data
US 2002/0080471 A1 Jun. 27, 2002

(30) Foreign Application Priority Data
Dec. 22, 2000 (JP) ...................... 2000-391570

(51) Int. Cl.$^7$ ................................. H01S 3/00
(52) U.S. Cl. .................... 359/337; 359/341.43
(58) Field of Search ..................... 359/337, 341.43

(56) References Cited

U.S. PATENT DOCUMENTS

| 5,923,463 | A | * | 7/1999 | Hamada ................... 359/341 |
| 6,064,514 | A | * | 5/2000 | Aoki et al. .................. 359/341 |
| 6,172,801 | B1 | * | 1/2001 | Takeda et al. ............... 359/337 |
| 6,437,908 | B2 | * | 8/2002 | Shiozaki et al. ........ 359/341.43 |

FOREIGN PATENT DOCUMENTS

| EP | 0930729 A2 | * | 7/1999 |
| JP | 5-206557 | | 8/1993 |
| JP | 06-152034 | | 5/1994 |
| JP | 06-216452 | | 8/1994 |
| JP | 9-153865 | | 6/1997 |
| JP | 9-321373 | | 12/1997 |
| JP | 09-321701 | | 12/1997 |
| JP | 411220197 A | * | 8/1999 |
| JP | 11-284574 | | 10/1999 |
| JP | 2000-174701 | | 6/2000 |

OTHER PUBLICATIONS

Japanese Office Action issued Jan. 7, 2003 (English translation of relevant portion).

* cited by examiner

Primary Examiner—Mark Hellner
(74) Attorney, Agent, or Firm—Dickstein, Shapiro, Morin & Oshinsky, LLP.

(57) ABSTRACT

In a light amplifier and a light amplifying method, a dummy light (saturated light) source 40 emits dummy light, a directional coupler 11 composes the dummy light with a light signal, and the composite light of the light signal and the dummy light is split into two parts to output a part thereof to a directional coupler 12. One part of the composite light (the light signal and the dummy light) output from the directional coupler 12 is amplified by a light amplifying portion 20, and the dummy light is removed from the composite light thus amplified by a dummy light removing filter 31. A dummy light (saturated light) source control circuit 50 controls the dummy light source 40 so that the light output of the dummy light source 40 is equal to predetermined light output. With this construction, lack of light input power due to reduction in the number of channels of the light signal of a transmission path is compensated by dummy light, thereby preventing over power of the signal light of the remaining wavelength.

8 Claims, 7 Drawing Sheets

LIGHT AMPLIFIER AND LIGHT AMPLIFYING METHOD

BACKGROUND OF THE INVENTION

1. Field of the Invention

The present invention relates to a light amplifier and a light amplifying method and particularly, to a light amplifier having a dummy light-inserting function and a light amplifying method therefor.

2. Description of the Related Art

A light amplifier and a light amplifying method have been hitherto applied for light amplification, for example in an optical communications system. Recently, explosive propagation of the Internet has urged a basic transmission system to rapidly increase its transmission capacity. In order to increase the transmission capacity by effectively using the present infrastructure, much attention has been paid to WDM (Wavelength Division Multiplexing), particularly DWDM (Dense Wavelength Division Multiplexing) having high density in the wavelength division multiplexing. A light amplifier and a light amplifying method have held high position as a means for collectively amplifying light signals which are subjected to the wavelength division multiplexing.

Figure 1:
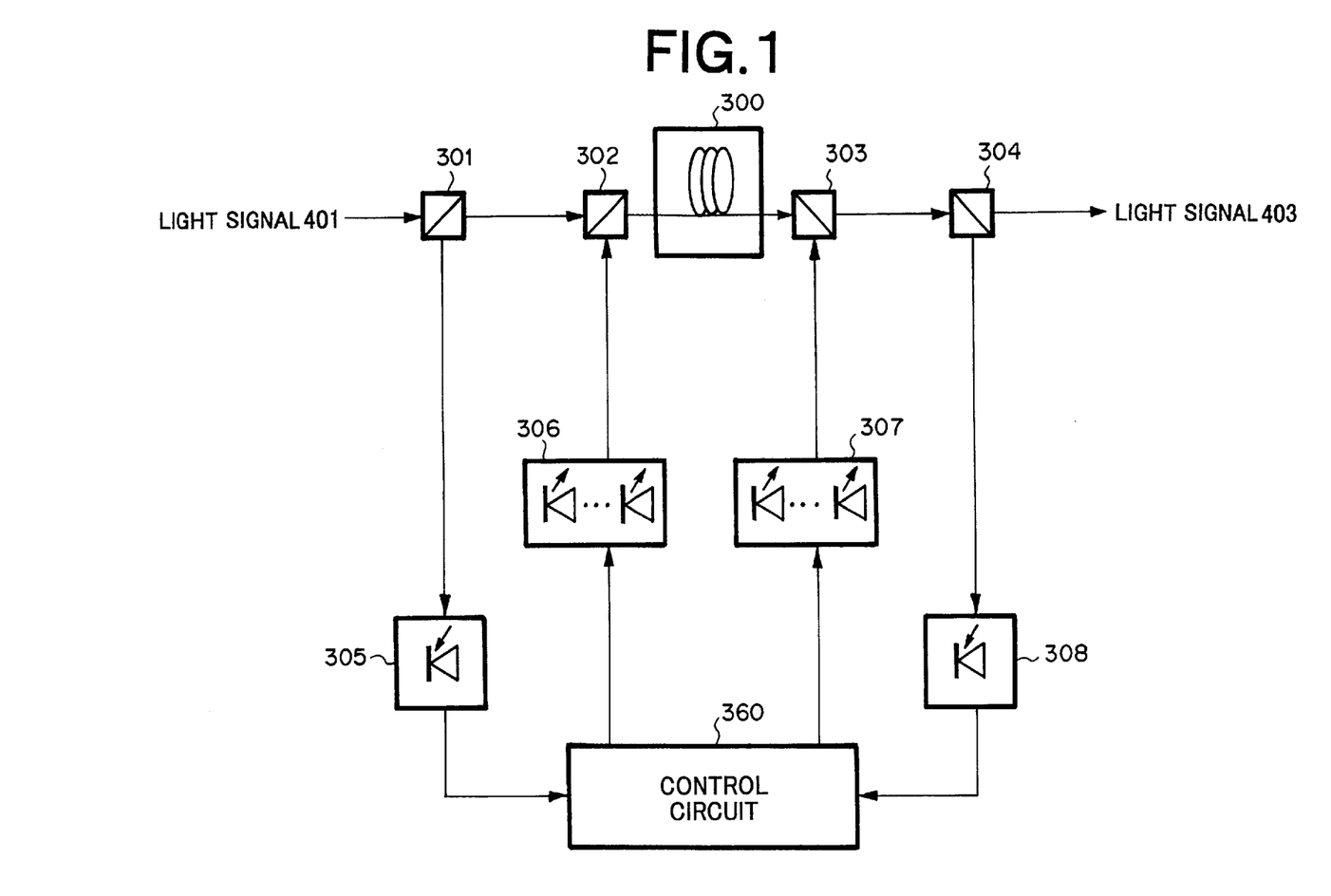
FIG. 1 is a block diagram showing the construction of a conventional general light amplifier.

FIG. 1 shows a conventional general light amplifier.

The light amplifier comprises directional couplers 301 and 304, excitation light couplers 302 and 303, light amplifying medium 300, front excitation light source 306, rear excitation light source 307, photo detectors 305 and 308, and control circuit 360.

Light signal 401 from a transmission path is split into two parts by the directional coupler 301, and one part thereof is converted to the electrical signal corresponding to input power by the photo detector 305. The output of the light amplifying medium 300 is split into two parts by the directional coupler 304, and a part thereof is converted to the electrical signal corresponding to output power to a transmission path by the photo detector 308. Light signal 403 is outputted from the light amplifier.

The control circuit 360 controls the power of each excitation light of the front excitation light source 306 and rear excitation light source 307 so that the output power to the transmission path is equal to predetermined power. The excitation light source may be disposed at only one of the front and rear sides.

If any trouble occurs at a terminal station serving as a transmission end of light signals or the like and thus the number of channels for the light signals of the transmission path is greatly reduced, the light amplifier is controlled to keep a predetermined light output at remaining wavelength numbers.

In the conventional technique described above, if any trouble occurs at a terminal station serving as a transmission end for the light signals and thus the number of channels for the light signals of the transmission path is greatly reduced, for example, the light amplifier is controlled to keep a predetermined light output at remaining wavelength numbers. As a result, the light sources for the remaining wavelengths are forced to power up. Further, generally, the control of the output of the light amplifier cannot sufficiently follow the rapid variation of the light power, and thus the light output of the transmission is greatly varied. Therefore, the conventional technique has also a disadvantage in keeping the quality of the transmission path.

SUMMARY OF THE INVENTION

The present invention has an object to provide a light amplifier and a light amplifying method which can prevent overpower of signal light of remaining wavelengths when the number of channels of multiplexed signals is rapidly reduced due to some trouble at a terminal station or the like.

In order to attain the above object, according to a first aspect of the present invention, there is provided a light amplifier comprising: a dummy light source for emitting dummy light; a first directional coupler for combining a light signal with the dummy light; a second directional coupler for splitting the composite light of the light signal and dummy light outputted from the first directional coupler; a light amplifying portion for amplifying the one part of the composite light outputted from the second directional coupler; a dummy light removing filter for removing the dummy light from the amplified composite light which is outputted from the light amplifying portion; and a dummy light control circuit for controlling the dummy light source so that the light output of the dummy light source is equal to a predetermined light output, wherein lack of the light input power due to reduction of the number of channels for light signals of a transmission path is compensated by the dummy light.

According to a second aspect of the present invention, there is provided a light amplifying method comprising: a dummy light emitting step of emitting dummy light; a first directional coupling step of combining a light signal with the dummy light; a second directional coupling step of splitting the composite light of the light signal and dummy light combined with said first directional coupling step; a light amplifying step of amplifying the one part of the composite light outputted with said second directional coupling step; a dummy light removing step of removing the dummy light from the amplified composite light which is outputted with said light amplifying step; and a dummy light control step of controlling the dummy light source so that the light output of the dummy light is equal to predetermined light output, wherein lack of the light input power due to reduction of the number of channels for light signals of a transmission path is compensated by the dummy light.

DETAILED DESCRIPTION OF THE PREFERRED EMBODIMENTS

Preferred embodiments of a light amplifier and a light amplifying method according to the present invention will be described hereunder with reference to the accompanying drawings.

[First Embodiment]

Figure 2:
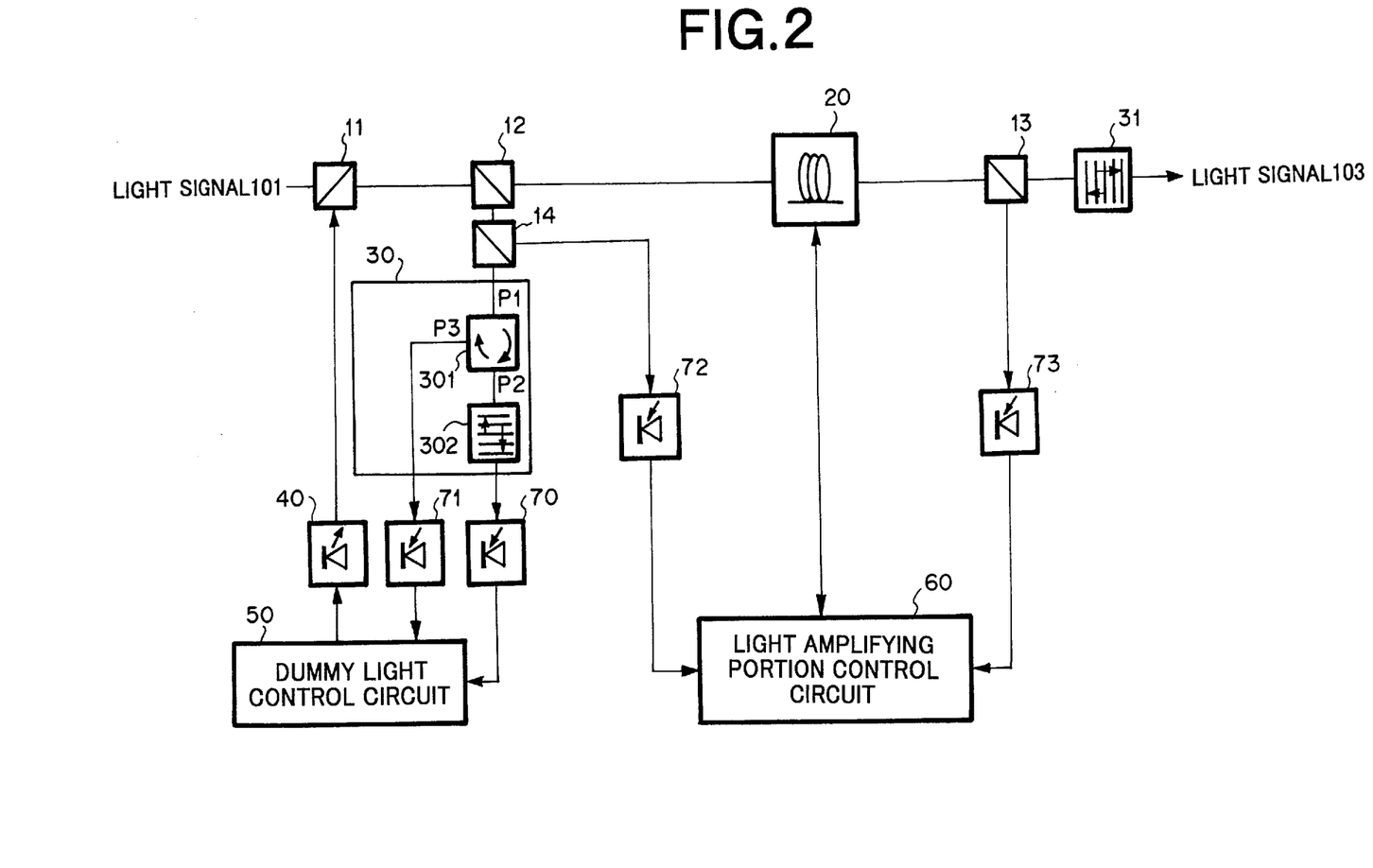
FIG. 2 is a block diagram showing the construction of a light amplifier and a light amplifying method according to a first embodiment of the present invention.

FIG. 2 shows the construction of a light amplifier and a light amplifying method according to a first embodiment of the present invention.

The light amplifier of this embodiment comprises directional couplers 11, 12, 13 and 14, light amplifying portion 20, dummy light (or saturated light) extracting filter 30, dummy light (or saturated light) removing filter 31, dummy light (or saturated light) source 40, dummy light (or saturated light) source control circuit 50, light amplifying portion control circuit 60, photo detectors 70, 71, 72 and 73. The dummy light extracting filter 30 comprises circulator 301 and FBG (Fiber Bragg Grating) 302. Light signal 101 is inputted to the light amplifier thus constructed, and light signal 103 is outputted from the light amplifier thus constructed.

The directional coupler 11 combines the light signal from a transmission path (not shown) with dummy light from dummy light source 40. The directional coupler 12 splits the composite light (the light signal and the dummy light) outputted from the directional coupler 11, and outputs a part of the composite light to the directional coupler 14 and outputs the remaining of the composite light to the light amplifying portion 20. The directional coupler 14 splits the light signal 101 and dummy light from the directional coupler 12 to the dummy light extracting filter 30 and the photo detector 72. The photo detector 72 converts the output of the directional coupler 14 to electrical signals.

The dummy light extracting filter 30 extracts the dummy light from the light signal split from the directional coupler 14 and outputs the dummy light to the photo detector 71. The light other than the dummy light is outputted to the photo detector 70.

The photo detector 71 converts the dummy light output of the dummy light extracting filter 30 to electrical signals. Further, the photo detector 70 converts the output other than the dummy light of the dummy light extracting filter 30 to electrical signals. The dummy light source control circuit 50 controls the dummy light source 40 so that the light output of the dummy light source 40 is equal to the predetermined light output.

The light amplifying portion 20 amplifies the light signal and dummy light from the directional coupler 12. The directional coupler 13 splits the composite light of the light signal 101 and dummy light which are amplified in the light amplifying portion 20 to output a part of the composite light to the photo detector 73 and outputs the remaining part of the composite light to the dummy light removing filter 31. The dummy light removing filter 31 removes the dummy light from the composite light of the light signal 101 and dummy light from the directional coupler 13 and outputs the light signal to the transmission path. The photo detector 73 converts the light signal split by the directional coupler 13 to the corresponding electrical signals.

The light amplifying portion control circuit 60 compares the electrical signal corresponding to the input power of the light signal from the photo detector 70 before amplification with the electrical signal corresponding to the output power of the light signal from the photo detector 73 after amplification, and controls the excitation light sources 206 and 207 (in FIG. 3) of the light amplifying portion 20 so that the predetermined gain and the output power to the transmission path can be kept.

Figure 3:
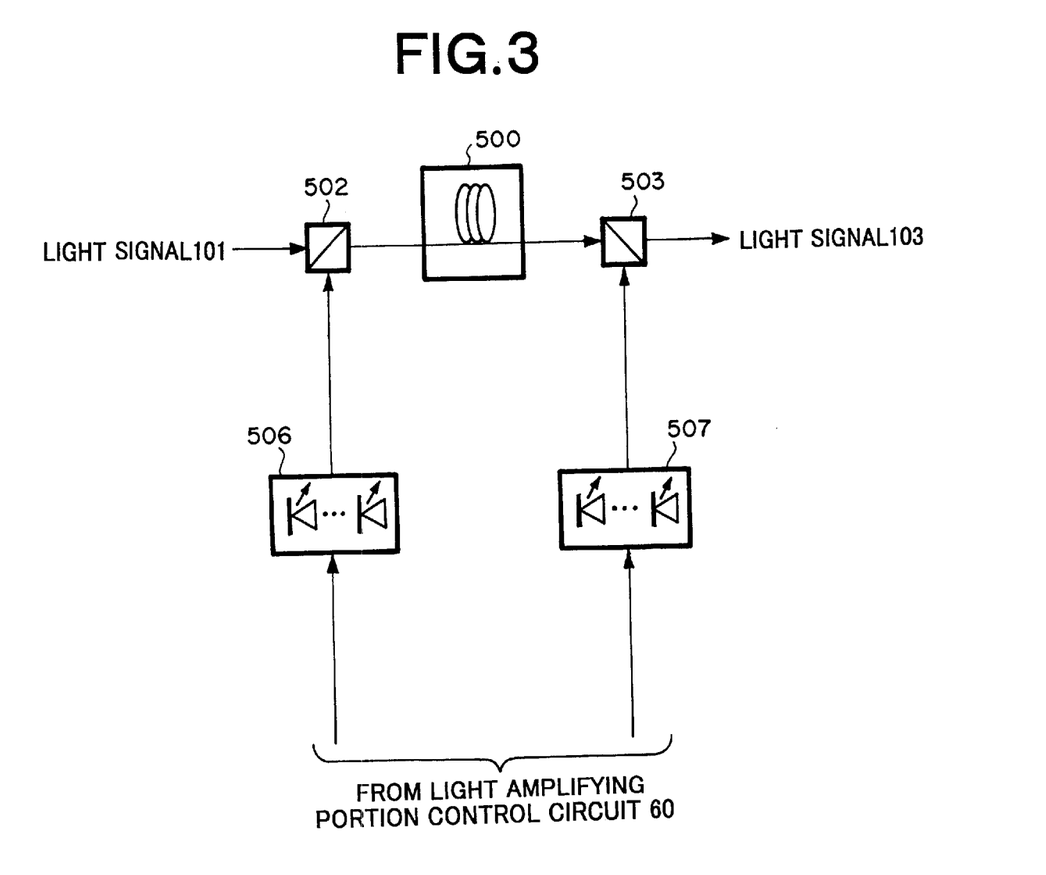
FIG. 3 is a block diagram showing the detailed construction of the light amplifying portion 20.

FIG. 3 shows the detailed construction of the circuit of the light amplifying portion 20.

In FIG. 3, the light amplifying portion 20 comprises light amplifying medium 500, excitation light couplers 502 and 503, front excitation light source 506 and rear excitation light source 507. Light signal 101 from the directional coupler 12 is inputted to the light amplifying portion 20, and light signal 103 is outputted from the light amplifying portion 20.

The light amplifying medium 500 amplifies the light signal from the excitation light coupler 502. The excitation light coupler 503 combines the composite light of the light signal and dummy light from the light amplifying medium 500 with excitation light from rear excitation light source 507. The rear excitation light source 507 comprises one or plural excitation light sources for which the light output is controlled by the light amplifying portion control circuit 60.

In the first embodiment, the light signal is excited at the input side of the light amplifying medium 500 by the front excitation light source 506 and at the output side of the light amplifying medium 500 by the rear excitation light source 507. However, it may be excited by only one of the front excitation light source 506 and the rear excitation light source 507.

In FIG. 2, the construction of the dummy light extracting filter 30 comprises the circulator 301 and the FBG 302, however, it is not limited to this construction. The circulator 301 has a characteristic of outputting an input from port p1 to port p2, outputting an input from the port p2 to port p3 and outputting an input from the port p3 to the port p1. The FBG (Fiber Bragg Grating) 302 has a characteristic of reflecting any wavelength by a diffraction grating provided to an optical fiber or the like.

Only the dummy light of the composite light (light signal and the dummy light) incident to the port p1 of the circulator 301 is reflected by FBG 302, and outputted from the port p3 of the circulator 301. The remaining light signal is passed through FBG 302 and incident to the photo detector 70.

The operation of the present invention will be described with reference to FIG. 2. The light signal of a transmission path (not shown) comprises the signal transmitted at plural wavelengths. The light signal 101 from the transmission path (not shown) is combined with dummy light from the dummy light source 40 by the directional coupler 11. When the light signal 101 is normal, the dummy light source control circuit 50 controls the dummy light source 40 to stop light emission.

The light signal 101 from the directional coupler 11 is split into two parts by the directional coupler 12 to branch a part thereof to the directional coupler 14, and the part of the light signal is further split into two parts by the directional coupler 14 to output a part thereof to the dummy light extracting filter 30 and output the other part thereof to the light amplifying portion control circuit 60.

The light signal 101 split by the directional coupler 14 is converted to the electrical signal corresponding to the input power of the light signal from the transmission path by the photo detector 72, and then inputted to the light amplifying portion control circuit 60.

The light signal amplified by the light amplifying portion 20 is also split by the directional coupler 13. A part of the light signal thus split is outputted to the photo detector 73, and converted to the electrical signal corresponding to the output power of the light signal output to the transmission path in the photo detector 73. The electrical signal thus converted is inputted to the light amplifying portion control circuit 60.

In the light amplifying portion control circuit 60, the electrical signal from the photo detector 72 is compared with the electrical signal from the photo detector 73, and the excitation light sources 206 and 207 (in FIG. 3) of the light amplifying portion 20 are controlled so that the predetermined gain and the output power to the transmission path can be kept.

The light signal that is split by the directional coupler 14 and then inputted to the dummy light extracting filter 30 is incident to the photo detector 70. The light signal is converted to the electrical signal corresponding to the input power of the light signal from the transmission path by the photo detector 70, and then inputted to the dummy light source control circuit 50.

When the input power of the light signal from the transmission path is normal, that is, when the magnitude of the electrical signal (the electrical signal outputted from the photo detector 70) corresponding to the input power of the light signal from the transmission path is equal to a predetermined value or more, the dummy light source control circuit 50 controls the dummy light source 40 to stop its light emission.

If some trouble occurs at a terminal station serving as a transmission end of light signals or the like and thus the number of channels for the light signals of the transmission path is greatly reduced, the light input power at the input terminal of the light amplifier is greatly reduced, so that the magnitude of the electrical signal converted by the photo detector 70 is reduced. The dummy light source control circuit 50 controls the dummy light source 40 to start light emission if the magnitude of the electrical signal converted by the photo detector 70 is reduced to a predetermined value or less, thereby compensating lack of the light input power.

The light power of the dummy light is combined with the light signal in the directional coupler 11, and amplified by the light amplifying portion 20. The dummy signal combined with the light signal in the directional coupler 11 is split together with the light signal by the directional coupler 12, and further split and output to the photo detector 72 and the dummy light extracting filter 30 by the directional coupler 14. Accordingly, the input power converted to the electrical signal in the photo detector 72 and the output power converted to the electrical signal in the photo detector 73 are equal to the total of the power of the light signal and power of the dummy light, so that the same light input power as achieved in the normal case can be kept in the light amplifier.

Only the dummy light of the composite light (the light signal and the dummy light) which is split in the directional coupler 14 and then partially inputted to the dummy extracting circuit 30 is reflected by FBG 302, outputted from the port p3 and then inputted to the photo detector 71. The remaining light signal is output from the photo detector 70.

The dummy light source control circuit 50 controls the power of the dummy light source 40 on the basis of the power of the dummy light converted to the electrical signal by the photo detector 71 and the input power of the light signal converted to the electrical signal by the photo detector 70 so that the total of the power of the dummy light and the input power of the light signal from the transmission path is approximate to the input power of the light signal at the normal time.

When the dummy light amplified by the light amplifying portion 20 is outputted to the transmission path, it causes a noise source at the reception terminal, and thus it is removed by the dummy light removing filter 31 just before it is output to the transmission path.

In WDM (Wavelength Divisional Multiplexing), even when some trouble occurs at a terminal station serving as a transmission end of light signals or the like and thus the number of channels for light signals of a transmission path is greatly reduced, the over power of the signal light of the other wavelengths can be prevented by inserting the dummy signal light (dummy light).

[Second Embodiment]

Figure 4:
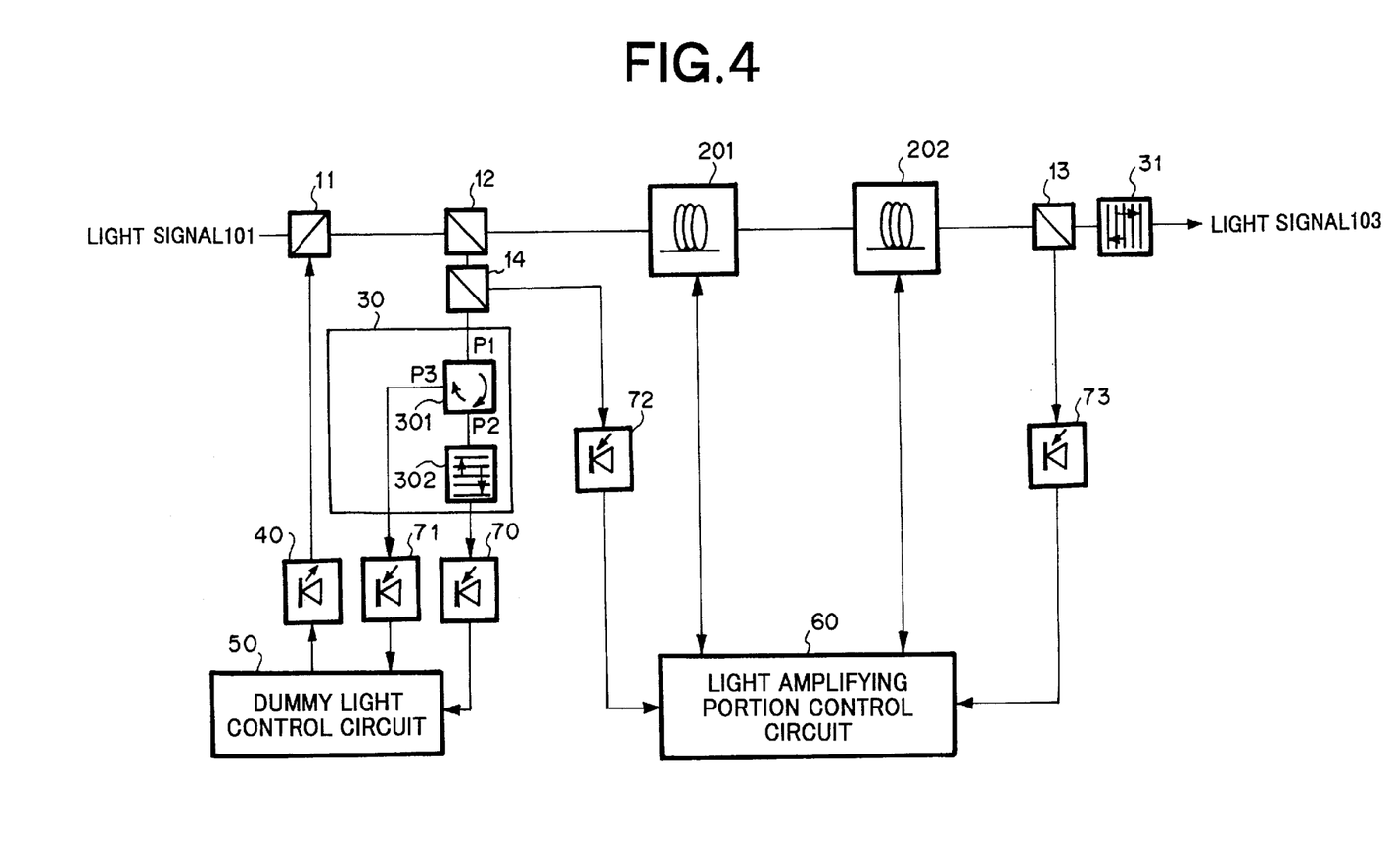
FIG. 4 is a block diagram showing the construction of a light amplifier according to a second embodiment of the present invention.

FIG. 4 is a block diagram showing the construction of a light amplifier according to a second embodiment of the present invention. In this embodiment, plural light amplifying portions (light amplifying portions 201 and 202) are provided. When a desired gain is not achievable by only one light amplifying portion, the light amplifying portions are provided at plural stages to secure a desired gain.

[Third Embodiment]

Figure 5:
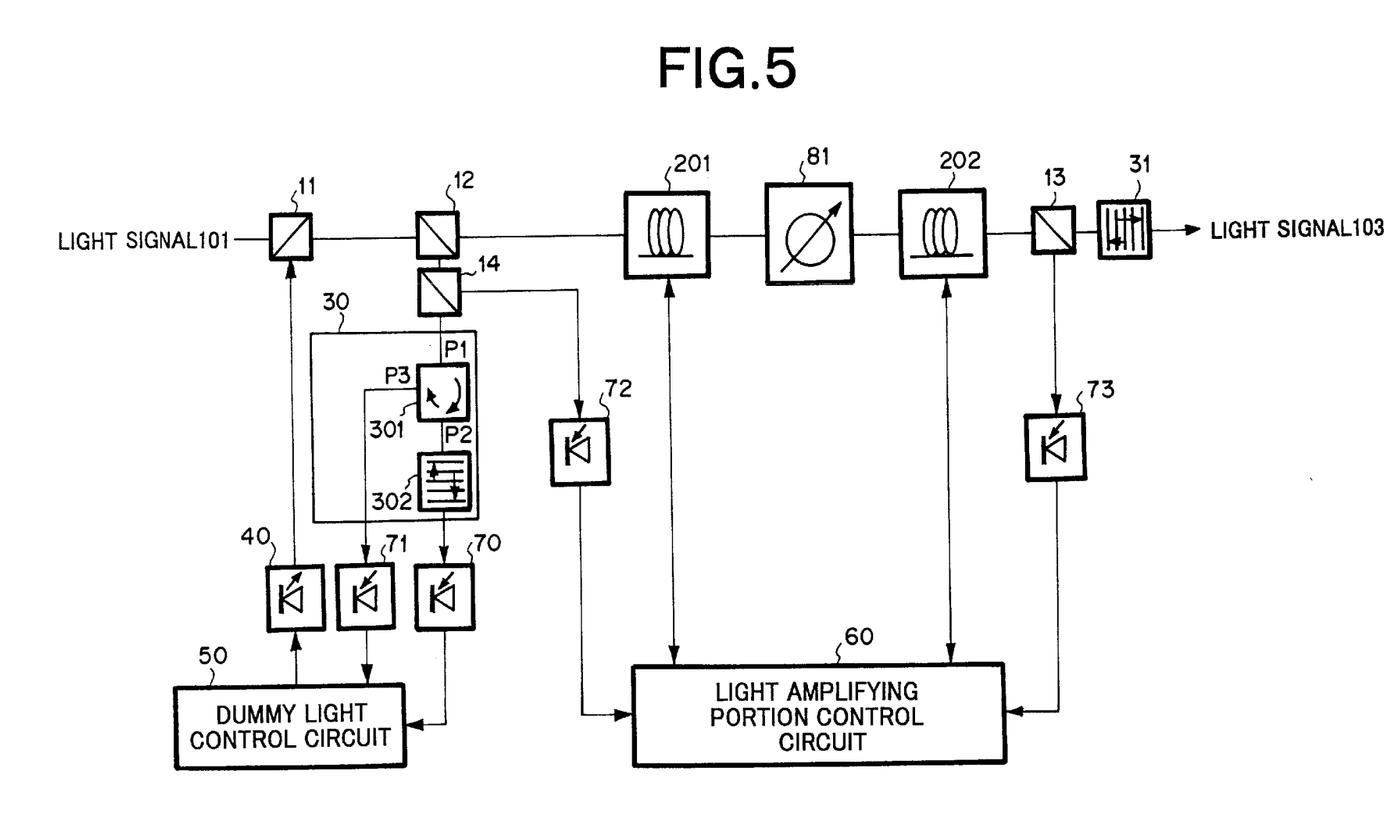
FIG. 5 is a block diagram showing the construction of a light amplifier according to a third embodiment of the present invention.

FIG. 5 is a block diagram showing the construction of a light amplifier according to a third embodiment of the present invention. In the third embodiment (in FIG. 5), light output adjusting means 81 such as a light fixed attenuator or a light variable attenuator is installed into the construction of the second embodiment. The light output adjusting means is disposed between the light amplifying portion at the front stage (the light amplifying portion 201 in the third embodiment) and the light amplifying portion at the rear stage (the light amplifying portion 202 in the third embodiment) to adjust the input level of light to the light amplifying portion at the next stage (the light amplifying portion 202 in the third embodiment), so that the gain can be optimally adjusted.

[Fourth Embodiment]

Figure 6:
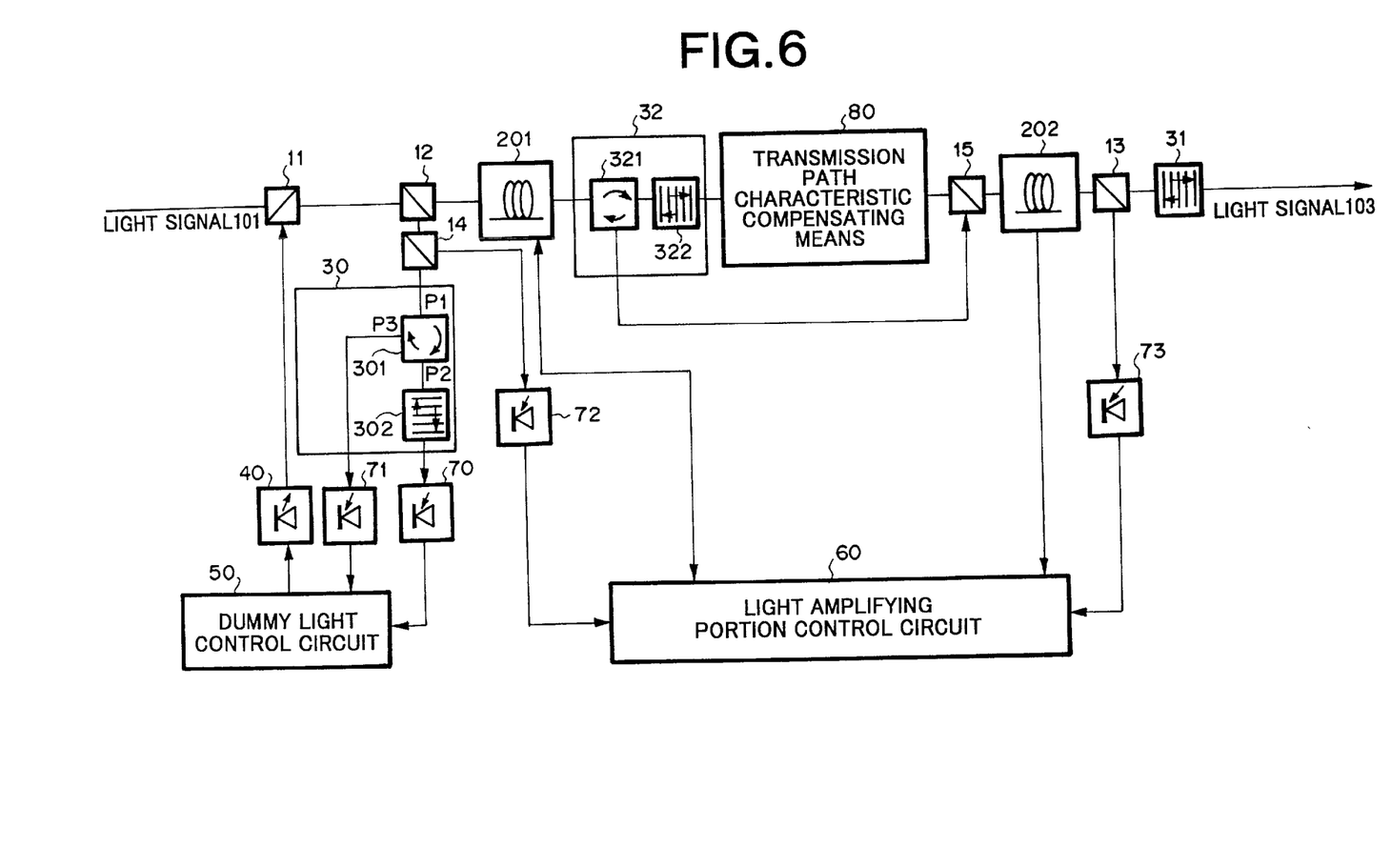
FIG. 6 is a block diagram showing the construction of a light amplifier according to a fourth embodiment of the present invention.

FIG. 6 is a block diagram showing the construction of a light amplifier according to a fourth embodiment of the present invention. In the fourth embodiment (in FIG. 6), transmission path characteristic compensating means 80 is installed in the construction of the second embodiment. A dispersion compensating fiber for compensating the dispersion characteristic of the transmission path or an equalizing filter for flattening the gain characteristic of each wavelength in a transmission band may be used as the transmission path characteristic compensating means. Further, it is unnecessary to input the dummy light to the transmission path characteristic compensating means 80, and thus it is preferable to separate and bypass the dummy light from the light signal at the input terminal of the transmission path characteristic compensating means 80 and combine the dummy light with the light signal again at the output terminal of the transmission path characteristic compensating means 80.

In the fourth embodiment, dummy light extracting filter 32 is disposed between the light amplifying portion 201 and the input of the transmission path characteristic compensating means 80, and directional coupler 15 for combining the dummy light with the light signal again is disposed between the output of the transmission path characteristic compensating means 80 and the light amplifying portion 202.

The dummy light extracting filter 32 has the same construction as the dummy light extracting filter 30, and it comprises circulator 321 and FBG 322. Only the dummy light is removed from the composite light (the light signal and the dummy light) outputted from the light amplifying portion 201 by the dummy light extracting filter 32, and the remaining light signal is inputted to the transmission path characteristic compensating means 80.

The dummy light removed by the dummy light extracting filter 32 is not passed through the transmission path characteristic compensating means 80, but it is combined with the light signal at the output terminal of the transmission path characteristic compensating means 80 by the directional coupler 15 again.

In general, the transmission path characteristic compensating means 80 causes a loss in the transmission path, however, by installing it in the light amplifier, the loss of the transmission path can be reduced.

[Fifth Embodiment]

Figure 7:
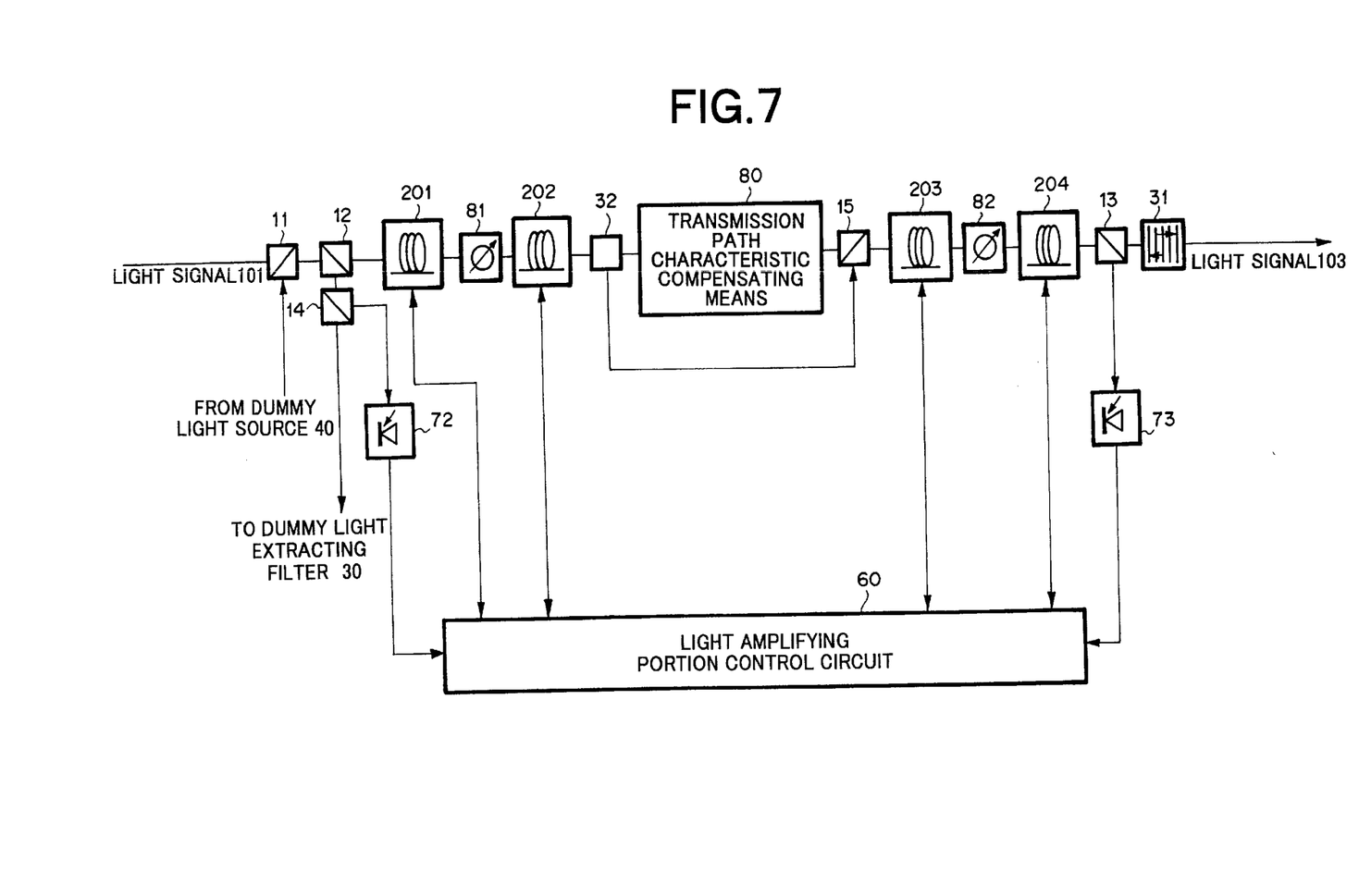
FIG. 7 is a block diagram showing the construction of a light amplifier according to a fifth embodiment of the present invention.

FIG. 7 is a block diagram showing the construction of a light amplifier according to a fifth embodiment of the present invention.

The fifth embodiment is constructed by combining the third and fourth embodiments with each other. In FIG. 7, the light signal is amplified at the four stages of the light amplifying portions 201, 202, 203 and 204, and the light output adjusting means 81, 82 are disposed between the light amplifying portions 201, 202 and between the light amplifying portions 203, 204. Further, the transmission path characteristic compensating means 80, the dummy light extracting filter 32 to bypass the dummy light from the transmission path characteristic compensating means 80 and the directional coupler 15 are inserted between the light amplifying portions 202 and 203.

The above embodiments are preferable embodiments of the present invention. However, the present invention is not limited to these embodiments, and various modifications may be made without departing from the subject matter of the present invention.

As described above, according to the light amplifier and the light amplifying method of the present invention, the light signal and the dummy light are combined with each other, the composite light thereof is split by the directional coupler, and a part of the light signal and the dummy light output from the directional coupler is amplified. The dummy light is removed from the composite light of the light signal and dummy light amplified, and the dummy light source is controlled so that the light output of the dummy light source is equal to predetermined light output, whereby lack of the light input power due to reduction in the number of channels for light signals of a transmission path can be compensated by the dummy light.

As described above, in WDM (Wavelength Division Multiplexing) or DWDM (Dense Wavelength Division Multiplexing), when the number of channels of multiplexed signals is rapidly reduced due to some trouble at a terminal station or the like, the reduction amount is compensated by inserting dummy light, thereby preventing over power of signal light of the remaining wavelengths.

What is claimed is:

1. A light amplifier comprising:
   a dummy light source for emitting dummy light;
   a first directional coupler for combining a light signal with the dummy light;
   a second directional coupler for splitting composite light of the light signal and dummy light outputted from said first directional coupler;
   a light amplifying portion for amplifying the one part of the composite light outputted from said second directional coupler;
   a dummy light removing filter for removing the dummy light from the amplified composite light which is outputted from said light amplifying portion; and
   a dummy light control circuit for controlling said dummy light source so that the light output of said dummy light source is equal to a predetermined light output, wherein lack of the light input power due to reduction of the number of channels for light signals of a transmission path is compensated by the dummy light.

2. The light amplifier as claimed in claim 1, wherein control of the light output of said dummy light source by said dummy light control circuit is carried out on the basis of the light signal in the other part of the composite light outputted from said second directional coupler.

3. The light amplifier as claimed in claim 1, which further comprises control means for controlling said light amplifying portion on basis of the split light signal of the other part of the composite light outputted from said second directional coupler and the sprit light signal of the composite light outputted from said light amplifying portion.

4. The light amplifier as claimed in claim 3, wherein said light amplifying portion comprises a light amplifying medium, a third directional coupler which is disposed between said second directional coupler and said light amplifying medium, a fourth directional coupler which is disposed between said light amplifying medium and said dummy light removing filter, first light and second light sources which are controlled by said control means.

5. The light amplifier as claimed in claim 1, wherein said light amplifying portion is connected with at least one other light amplifying portion and output light from at least one of the light amplifying portions is inputted to said dummy light removing filter.

6. The light amplifier as claimed in claim 5, which further comprises a light output adjusting means that adjusts the light input level and is disposed between said light amplifying portions.

7. The light amplifier as claimed in claim 5, which further comprises a transmission path characteristic compensating means that compensates the dispersion characteristic of the transmission path and is provided between said light amplifying portions.

8. A light amplifying method comprising:
   a dummy light emitting step of emitting dummy light;
   a first directional coupling step of combining a light signal with the dummy light;
   a second directional coupling step of splitting the composite light of the light signal and dummy light combined with said first directional coupling step;
   a light amplifying step of amplifying the one part of the composite light outputted with said second directional coupling step;
   a dummy light removing step of removing the dummy light from the amplified composite light which is outputted with said light amplifying step; and
   a dummy light control step of controlling the dummy light source so that the light output of the dummy light is equal to a predetermined light output, wherein lack of the light input power due to reduction of the number of channels for light signals of a transmission path is compensated by the dummy light.

* * * * *